United States Patent
Zhang et al.

(10) Patent No.: US 12,025,492 B2
(45) Date of Patent: Jul. 2, 2024

(54) DISPLAY PANEL

(71) Applicant: WUHAN CHINA STAR OPTOELECTRONICS TECHNOLOGY CO., LTD., Hubei (CN)

(72) Inventors: Zhou Zhang, Hubei (CN); Changwen Ma, Hubei (CN); Pan Xu, Hubei (CN); Guowei Zha, Hubei (CN); Xiaoyan Niu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/622,788

(22) PCT Filed: Dec. 15, 2021

(86) PCT No.: PCT/CN2021/138499
§ 371 (c)(1),
(2) Date: Dec. 24, 2021

(87) PCT Pub. No.: WO2023/102987
PCT Pub. Date: Jun. 15, 2023

(65) Prior Publication Data
US 2024/0035886 A1   Feb. 1, 2024

(30) Foreign Application Priority Data
Dec. 12, 2021  (CN) .......................... 202111513146.2

(51) Int. Cl.
*G01J 1/46* (2006.01)
*G01J 1/42* (2006.01)
(Continued)

(52) U.S. Cl.
CPC ............... *G01J 1/46* (2013.01); *G01J 1/4204* (2013.01); *G06F 3/0412* (2013.01);
(Continued)

(58) Field of Classification Search
CPC ...... G01J 1/46; G01J 1/4204; G01J 2001/446; G06F 3/0412; G06F 3/0416; G09G 3/20; G09G 2354/00; G09G 2360/144
(Continued)

(56) References Cited

U.S. PATENT DOCUMENTS

| | | | | |
|---|---|---|---|---|
| 2008/0062156 A1* | 3/2008 | Abileah | .................. | G06F 3/042 345/204 |
| 2010/0103089 A1* | 4/2010 | Yoshida | ............... | G09G 3/3426 345/102 |

(Continued)

FOREIGN PATENT DOCUMENTS

| | | | | |
|---|---|---|---|---|
| CA | 2749607 A1 * | 7/2010 | ........... | G06F 3/0412 |
| CN | 201569824 U | 9/2010 | | |

(Continued)

OTHER PUBLICATIONS

International Search Report in International application No. PCT/CN2021/138499, dated Aug. 25, 2022.

(Continued)

*Primary Examiner* — Kwin Xie
(74) *Attorney, Agent, or Firm* — PV IP PC; Wei Te Chung; Zhigang Ma (57) ABSTRACT

A display panel has a display area and a non-display area surrounding the display area, and includes photosensitive components and a photosensitive driving circuit. The photosensitive components are used to sense ambient light, and the photosensitive driving circuit is connected to the photosensitive components to drive the photosensitive components. The photosensitive driving circuit is disposed in the (Continued)

non-display area, and at least a part of the photosensitive components is disposed in the non-display area.

17 Claims, 4 Drawing Sheets

(51) Int. Cl.
    *G01J 1/44*     (2006.01)
    *G06F 3/041*     (2006.01)
    *G09G 3/20*     (2006.01)

(52) U.S. Cl.
    CPC ............ *G06F 3/0416* (2013.01); *G09G 3/20* (2013.01); *G01J 2001/446* (2013.01); *G09G 2354/00* (2013.01); *G09G 2360/144* (2013.01)

(58) Field of Classification Search
    USPC ................................................ 345/173–174
    See application file for complete search history.

(56) References Cited

U.S. PATENT DOCUMENTS

| | | | | |
|---|---|---|---|---|
| 2012/0313913 | A1* | 12/2012 | Shiraki | G06F 3/0412 345/207 |
| 2014/0183342 | A1* | 7/2014 | Shedletsky | H10K 50/828 250/215 |
| 2017/0231058 | A1* | 8/2017 | Sadwick | H05B 45/18 |
| 2018/0113548 | A1 | 4/2018 | Lee et al. | |
| 2020/0382739 | A1 | 12/2020 | Lu et al. | |

FOREIGN PATENT DOCUMENTS

| | | |
|---|---|---|
| CN | 106935190 A | 7/2017 |
| CN | 108389879 A | 8/2018 |
| CN | 109243387 A | 1/2019 |
| CN | 111176486 A | 5/2020 |
| CN | 112259581 A | 1/2021 |
| CN | 112331141 A | 2/2021 |
| CN | 112418125 A | 2/2021 |
| CN | 112510015 A | 3/2021 |
| CN | 112597805 A | 4/2021 |
| CN | 112599064 A | 4/2021 |
| CN | 112738429 A | 4/2021 |
| CN | 113591676 A | 11/2021 |
| CN | 113675255 A | 11/2021 |
| JP | 200177342 A | 3/2001 |
| JP | 200223658 A | 1/2002 |
| JP | 201818156 A | 2/2018 |
| KR | 20090051602 A | 5/2009 |
| KR | 20090121635 A | 11/2009 |
| KR | 201774310 | 6/2017 |
| KR | 20180070463 A | 6/2018 |
| KR | 202057373 A | 5/2020 |
| WO | WO-2017066496 A1 * | 4/2017 |
| WO | 202138392 A1 | 3/2021 |

OTHER PUBLICATIONS

Written Opinion of the International Search Authority in International application No. PCT/CN2021/138499, dated Aug. 25, 2022.
Chinese Office Action issued in corresponding Chinese Patent Application No. 202111513146.2 dated Jul. 21, 2022, pp. 1-10.
Eurasian Office Action issued in corresponding Eurasian Patent Application No. 202292872 dated Feb. 20, 2023, pp. 1-3.
Korean Office Action issued in corresponding Korean Patent Application No. 10-2022-7003205 dated Sep. 20, 2023, pp. 1-5.
Japanese Office Action issued in corresponding Japanese Patent Application No. 特願2021-576401 dated Jan. 23, 2024, pp. 1-6.

* cited by examiner

|    | Vin  | GN | K2 | K1  | Vref | Vcom | Point Q                    |                                                      |
|----|------|----|----|-----|------|------|----------------------------|------------------------------------------------------|
| P1 | TVCL | on | on | off | TVCH | TVCL | TVCH-I*(P4+P1+exposure_time)/C1 | capture a value after exposure and a first value is invalid |
| P2 | TVCL | on | on | on  | TVCH | TVCL | TVCH                       | reset                                                |
| P3 | TVCH | on | on | off | TVCH | TVCL | TVCH                       | reset                                                |
| P4 | TVCH | on | on | off | TVCH | TVCL | TVCH-I*P4/C1               | capture a value after reset                          |

FIG. 8

| Prior art | display | touch control | display | touch control | display |  | display | touch control | display | touch control | display | touch control |  |
|---|---|---|---|---|---|---|---|---|---|---|---|---|---|
| The invention | display | touch control | display | touch control | display | photosensitive reset | display | touch control | display | touch control | display | touch control | photosensitive capture |

FIG. 9

DISPLAY PANEL

FIELD OF INVENTION

The present disclosure relates to the field of display technologies, and more particularly, to a display panel.

BACKGROUND OF INVENTION

In current display technologies, an ambient light detection function of display panels is realized by externally connecting the display panels with independent ambient light detection modules. The independent ambient light detection modules are externally connected to the display panels, thereby increasing a frame area of display devices.

Technical problem: the present disclosure provides a display panel to reduce the frame area of the display devices.

SUMMARY OF INVENTION

The present disclosure provides a display panel, which has a display area and a non-display area surrounding the display area, and includes photosensitive components and a photosensitive driving circuit. The photosensitive components are used to sense ambient light, and the photosensitive driving circuit is connected to the photosensitive components to drive the photosensitive components.

Wherein, the photosensitive driving circuit is disposed in the non-display area, and at least a part of the photosensitive components is disposed in the non-display area.

Optionally, in some embodiments of the present disclosure, all the photosensitive components are disposed in the non-display area.

Optionally, in some embodiments of the present disclosure, a part of the photosensitive components is disposed in the display area.

Optionally, in some embodiments of the present disclosure, the at least the part of the photosensitive components disposed in the non-display area is set on at least one side of a first side or a second side of the display area, and the first side and the second side are opposite to each other.

Optionally, in some embodiments of the present disclosure, the at least the part of the photosensitive components disposed in the non-display area is further set on a third side of the display area, and the third side is connected to the first side and the second side.

Optionally, in some embodiments of the present disclosure, the photosensitive components include at least one optical sensor assembly, and the at least one optical sensor assembly includes at least one optical sensor.

Optionally, in some embodiments of the present disclosure, the at least one optical sensor assembly includes a visible light sensor, or a white light sensor and a reference light sensor, or a white light sensor, a reference light sensor, a red light sensor, a green light sensor, and a blue light sensor.

Optionally, in some embodiments of the present disclosure, the at least one optical sensor is one of a photosensitive P-N junction, a photosensitive diode, or a photosensitive thin film transistor.

Optionally, in some embodiments of the present disclosure, the display panel further includes a touch control component and a touch control driving circuit, wherein, the touch control component is connected to the touch control driving circuit, the touch control driving circuit is used to drive the touch control component, and the photosensitive driving circuit and the touch control driving circuit use a same chip for driving.

Optionally, in some embodiments of the present disclosure, the display panel further includes a display component and a display driving circuit, wherein, the display component is connected to the display driving circuit, the display driving circuit is used to drive the display component, and the photosensitive driving circuit and the display driving circuit use the same chip for driving.

Optionally, in some embodiments of the present disclosure, the display panel further includes a touch control component and a touch control driving circuit, wherein, the touch control component is connected to the touch control driving circuit, the touch control driving circuit is used to drive the touch control component, and the photosensitive driving circuit and the touch control driving circuit use different chips for driving.

Optionally, in some embodiments of the present disclosure, the display panel further includes a touch control component and a touch control driving circuit, wherein, the touch control component is connected to the touch control driving circuit, the touch control driving circuit is used to drive the touch control component, and the photosensitive components and the touch control component are driven at a same time.

Optionally, in some embodiments of the present disclosure, the display panel further includes a touch control component and a touch control driving circuit, wherein, the touch control component is connected to the touch control driving circuit, the touch control driving circuit is used to drive the touch control component, and the photosensitive components and the touch control component are driven in a time-divisionally driven manner.

Optionally, in some embodiments of the present disclosure, the display panel further includes a display component and a display driving circuit, wherein, the display component is connected to the display driving circuit, the display driving circuit is used to drive the display component, and the photosensitive components, the touch control component, and the display component are driven in the time-divisionally driven manner.

Optionally, in some embodiments of the present disclosure, a driving period of the photosensitive components is a blanking period other than a driving period of the touch control component and a driving period of the display component within one frame time.

Optionally, in some embodiments of the present disclosure, the display panel further includes a touch control component and a touch control driving circuit, wherein, the touch control component is connected to the touch control driving circuit, the touch control driving circuit is used to drive the touch control component, and at least a part of the photosensitive driving circuit and the touch control driving circuit use a same line path.

Optionally, in some embodiments of the present disclosure, the display panel further includes a touch control component and a touch control driving circuit, wherein, the touch control component is connected to the touch control driving circuit, the touch control driving circuit is used to drive the touch control component, and the photosensitive driving circuit and the touch control driving circuit use different line paths.

Optionally, in some embodiments of the present disclosure, the photosensitive driving circuit includes:

a first capacitor, a photodiode, and a switch transistor; and the first capacitor and the photodiode are connected in parallel, a positive electrode of the photodiode is connected to a common electrical signal, a negative electrode of the photodiode is connected to a first electrode of the switch transistor, a gate electrode of the switch transistor is connected to a gate signal, and a second electrode of the switch transistor is connected to a photosensitive input electrical signal.

Optionally, in some embodiments of the present disclosure, the photosensitive driving circuit further includes:

a first switch, a second switch, a second capacitor, and an amplifier; and the first switch, the second capacitor, and the amplifier are connected in parallel with each other, one end of the second switch is connected to the photosensitive input electrical signal, another end of the second switch is connected to a non-inverting input terminal of the amplifier, an inverting input terminal of the amplifier is connected to a reference electrical signal, and an output terminal of the amplifier is connected to a digital-to-analog converter.

Optionally, in some embodiments of the present disclosure, the photosensitive driving circuit includes:

a capacitor, a diode, a first transistor, a second transistor, a third transistor, and a fourth transistor; and the capacitor is connected in parallel with the diode, a positive electrode of the diode is connected to a common electrical signal, a negative electrode of the diode is connected to a second electrode of the first transistor and a gate electrode of the second transistor, a first electrode of the first transistor and a first electrode of the second transistor are connected to a power supply signal, a second electrode of the second transistor is connected to a first electrode of the third transistor, a second electrode of the third transistor is connected to a first electrode of the fourth transistor and an output terminal, a gate electrode of the third transistor is connected to a gate signal, a gate electrode of the fourth transistor is connected to a base signal, and a second electrode of the fourth transistor is connected to a ground signal.

Beneficial effect: the present disclosure provides a display panel, which has a display area and a non-display area surrounding the display area and includes photosensitive components and a photosensitive driving circuit. The photosensitive components are used to sense ambient light, and the photosensitive driving circuit is connected to the photosensitive components to drive the photosensitive components. Wherein, the photosensitive driving circuit is disposed in the non-display area, and at least a part of the photosensitive components is disposed in the non-display area. By disposing the photosensitive components and the photosensitive driving circuit that are used to sense ambient light inside the display panel, thereby realizing integration of ambient light detection into the display panel. Therefore, integrating ambient light detection functions without increasing bezels of display devices, the present disclosure can omit external independent ambient light detection modules, reduce the bezels of the display devices, and reduce costs of ambient light detection modules at a same time.

DESCRIPTION OF DRAWINGS

The following detailed description of specific embodiments of the present disclosure will make the technical solutions and other beneficial effects of the present disclosure obvious with reference to the accompanying drawings.

DETAILED DESCRIPTION OF PREFERRED EMBODIMENTS

In current display technologies, display panels are externally connected to independent ambient light detection modules, thereby causing display devices to have large bezel areas. The present disclosure provides a display panel to solve this problem.

Figure 1:
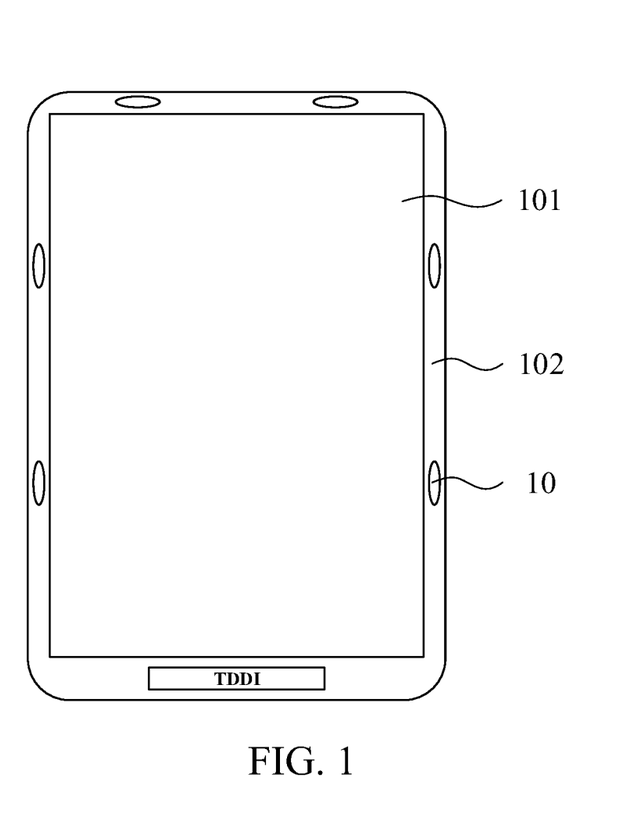
FIG. 1 is a schematic planar diagram of a display panel according to an embodiment of the present disclosure.

In an embodiment, referring to FIG. 1, FIG. 1 shows a schematic planar diagram of the display panel according to an embodiment of the present disclosure. As shown in FIG. 1, the display panel 10 provided in this embodiment includes a display area 101 and a non-display area 102 surrounding the display area 101. The display panel 10 includes:

a display component and a display driving circuit, wherein, the display driving circuit is connected to the display component and used to drive the display component to emit light and display;

a touch control component and a touch control driving circuit, wherein, the touch control driving circuit is connected to the touch control component and used to drive the touch control component to sense a touch control signal; and photosensitive components 10 and a photosensitive driving circuit, wherein, the photosensitive driving circuit is connected to the photosensitive components 10 and used to drive the photosensitive components 10 to sense ambient light.

Wherein, the photosensitive driving circuit is disposed in the non-display area 102, and at least a part of the photosensitive components 10 is disposed in the non-display area 102.

By disposing the photosensitive components and the photosensitive driving circuit that are used to sense ambient light inside the display panel, this embodiment realizes integration of display, touch control, and ambient light detection into the display panel. Therefore, integrating ambient light detection functions without increasing bezels of display devices, the present disclosure can omit external independent ambient light detection modules, reduce the bezels of the display devices, and reduce costs of ambient light detection modules at a same time.

In an embodiment of the present disclosure, the photosensitive components 10 include at least one optical sensor assembly, and the at least one optical sensor assembly includes at least one optical sensor. The at least one optical sensor may be one or more of electronic components with photosensitive functions, such as a photosensitive P-N junction, a photosensitive diode, or a photosensitive thin film transistor.

In an embodiment, the at least one optical sensor assembly includes a visible light sensor, which is configured to sense visible light in the environment and convert a sensed visible light signal into a corresponding electrical signal.

In another embodiment, the at least one optical sensor assembly includes a white light sensor and a reference light sensor, a size of the reference light sensor is equivalent to a size of the white light sensor, and the reference light sensor is an optical sensor with a layer of opaque film structure. The white light sensor is configured to sense the visible light in the environment and convert the sensed visible light signal into the corresponding electrical signal, and the reference light sensor is used to reduce a noise of the white light sensor.

In yet another embodiment, the at least one optical sensor assembly includes a white light sensor, a reference light sensor, a red light sensor, a green light sensor, and a blue light sensor. Wherein, the red light sensor is an optical sensor with a layer of red color filter or red color resist, the green light sensor is an optical sensor with a layer of green color filter or green color resist, and the blue light sensor is an optical sensor with a layer of blue color filter or blue color resist. The red light sensor, the green light sensor, and the blue light sensor are respectively used to detect red light, green light, and blue light in the environment to determine a color temperature of the ambient light, and then adjust the color temperature of the display panel.

In other embodiments, the at least one optical sensor assembly may include other types or numbers of optical sensors to realize functions of detecting the ambient light, which is not limited here.

In an embodiment, as shown in FIG. 1, all the photosensitive components 10 are disposed in the non-display area 102. When the photosensitive components 10 only include a set of optical sensor assembly, a photosensitive component 10 may be arranged on either side of left and right sides of the display area 101 in the non-display area 102 in FIG. 1. When the photosensitive components 10 include at least two set of optical sensor assemblies, the photosensitive components 10 may be arranged in the non-display area 102 on either side of left and right sides of the display area 101 in FIG. 1, may be arranged in the non-display area 102 on the left and right sides of the display area 101 in FIG. 1, may be arranged in the non-display area 102 on either side of the left and right sides and an upper side of the display area 101 in FIG. 1, or may be arranged in the non-display area 102 on the left and right sides and the upper side of the display area 101 in FIG. 1. Thus, the photosensitive components 10 are disposed in the non-display area 102 on at least one side of the left and right sides of the display area 101, so when the display panel 10 is horizontal and the non-display area 102 on the upper side of the display area 101 in FIG. 1 is shielded, the photosensitive components 10 located on the left and right sides of the display area 101 can still detect the ambient light, thereby ensuring normal operation of ambient light detection functions of the display panel 10.

In an embodiment, a part of the photosensitive components 10 is disposed in the display area 101, and the part of the photosensitive components 10 is disposed in the display area 101 adjacent to the non-display area 102, that is, a part of the photosensitive components 10 is disposed in the non-display area 102, and another part of the photosensitive components 10 is disposed in the display area. Similarly, the photosensitive components 10 disposed in the display area 101 may be arranged on either side of the left and right sides of the display area 101, may be arranged on the left and right sides of the display area 101 in FIG. 1, may be arranged on either side of the left and right sides and the upper side of the display area 101 in FIG. 1, or may be arranged on the left and right sides and the upper side of the display area 101 in FIG. 1.

Figure 2:
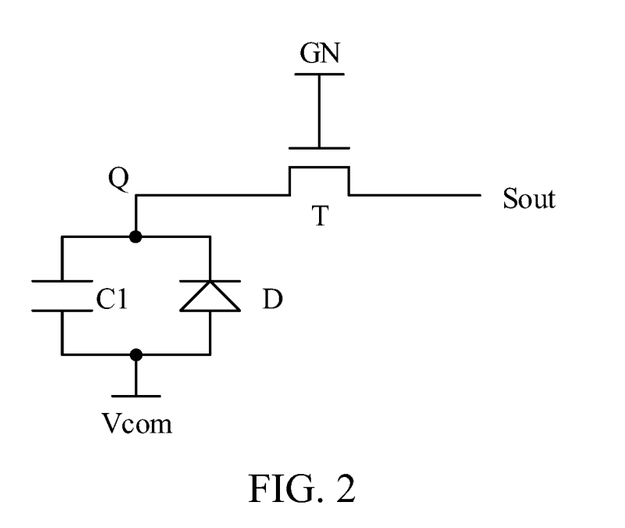
FIG. 2 is a first schematic circuit diagram of a first photosensitive driving circuit of the display panel according to an embodiment of the present disclosure.
Figure 3:
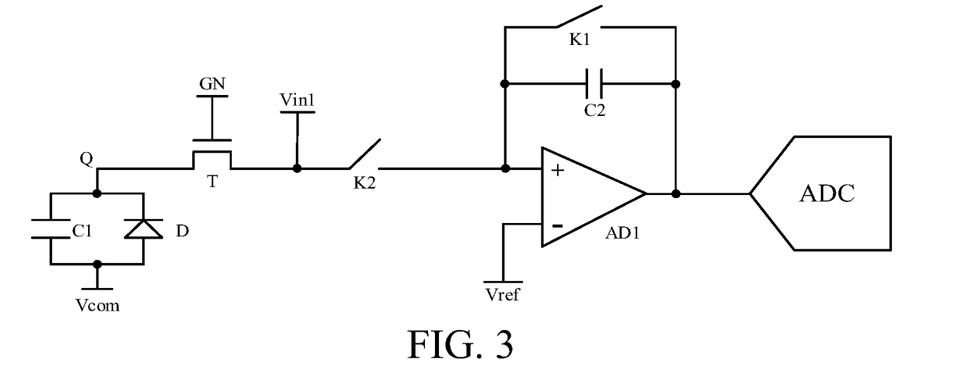
FIG. 3 is a second schematic circuit diagram of the first photosensitive driving circuit of the display panel according to an embodiment of the present disclosure.

In an embodiment, referring to FIGS. 2 and 3, FIG. 2 shows a first schematic circuit diagram of a first photosensitive driving circuit of the display panel according to an embodiment of the present disclosure, and FIG. 3 shows a second schematic circuit diagram of the first photosensitive driving circuit of the display panel according to an embodiment of the present disclosure. As shown in FIGS. 2 and 3, the photosensitive driving circuit includes:

a first capacitor C1, a photodiode D, and a switch transistor T. The first capacitor C1 and the photodiode D are connected in parallel, a positive electrode of the photodiode D is connected to a common electrical signal Vcom, a negative electrode of the photodiode D is connected to a first electrode of the switch transistor T, a gate electrode of the switch transistor T is connected to a gate signal GN, and a second electrode of the switch transistor T is connected to an output terminal Sout of the driving circuit shown in FIG. 2, and at a same time, the second electrode of the switch transistor T is connected to a photosensitive input electrical signal Vin1 shown in FIG. 3.

the photosensitive driving circuit further includes a first switch K1, a second switch K2, a second capacitor C2, and an amplifier AD1. The first switch K1, the second capacitor C2, and the amplifier AD1 are connected in parallel with each other, one end of the second switch K2 is connected to the photosensitive input electrical signal Vin1, another end of the second switch K2 is connected to a non-inverting input terminal of the amplifier AD1, an inverting input terminal of the amplifier AD1 is connected to a reference electrical signal Vref, and an output terminal of the amplifier AD1 is connected to a digital-to-analog converter ADC.

Wherein, the photodiode D is a photosensitive component, and the photodiode D generates a photo-generated voltage after being irradiated by the ambient light, which affects a voltage value at point Q, thereby affecting charges on the first capacitor C1. Different ambient light illumination causes different changes in an amount of the charges on the first capacitor C1, thereby affecting an output voltage of the output terminal Sout. An optical signal of the ambient light can be obtained by amplifying and analyzing the output voltage of the output terminal Sout, wherein, the optical signal of the ambient light includes, but is not limited to, light intensities of white light, red light, green light, and blue light in the ambient light, and color temperatures of the red light, the green light, and the blue light.

In an embodiment, the photosensitive driving circuit and the touch control driving circuit use different line paths for signal detection, that is, the photosensitive driving circuit uses a line path that is independent and different from that of the touch control driving circuit for signal transmission.

Figure 4:
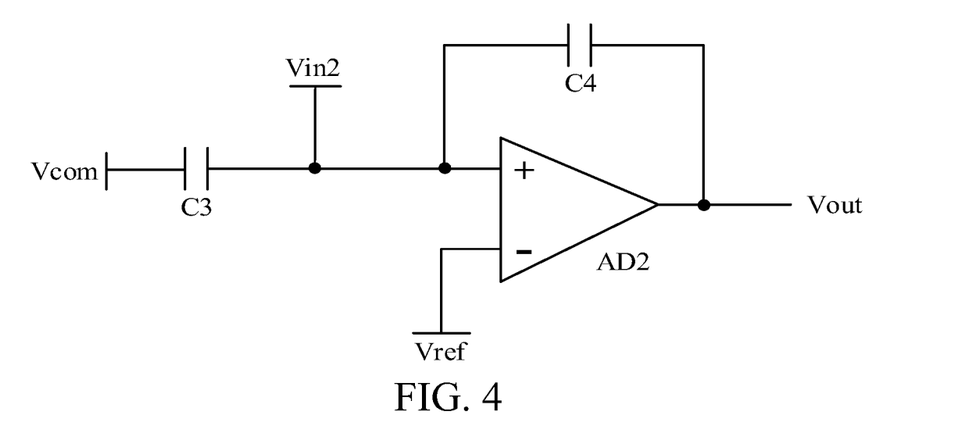
FIG. 4 is a schematic circuit diagram of a touch control driving circuit of the display panel according to an embodiment of the present disclosure.

In another embodiment, at least a part of the photosensitive driving circuit and the touch control driving circuit use a same line path for signal detection. As shown in FIG. 4, FIG. 4 shows a schematic circuit diagram of the touch control driving circuit of the display panel according to an embodiment of the present disclosure. The touch control driving circuit includes a third capacitor C3, a fourth capacitor C4, and a second amplifier AD2. Wherein, the third capacitor C3 is a capacitor of the touch control component. A capacitance of the third capacitor C3 is affected by touch operation. The touch control driving circuit outputs different voltage signals according to a change of the capacitance of the third capacitor C3. The fourth capacitor C4 and the second amplifier AD2 are connected in parallel, one end of the third capacitor C3 is connected to a common electrical signal Vcom, another end of the third capacitor C3 is connected to a non-inverting input terminal of the second amplifier AD2 and a touch control input electrical signal Vin2, an inverting input terminal of the second amplifier AD2 is connected to a reference electrical signal Vref, and an output terminal of the second amplifier AD2 is connected to an output terminal Vout of the touch control driving circuit.

In the photosensitive driving circuit shown in FIG. 3, when the switch transistor T is turned on, the first switch K1 is turned off, and the second switch K2 is turned on, the photosensitive driving circuit is equivalent to the touch control driving circuit. Therefore, the photosensitive driving circuit and the touch control driving circuit may use the same line path for signal detection. The touch control driving circuit corresponds to 600 to 1000 touch control lines. The touch control lines are used to detect and transmit touch signals of the display panel. Among hundreds of touch control lines, several, tens, dozens, or hundreds of the touch control lines may be used as paths for ambient light detection, that is, used for detection and transmission of ambient light signals, and remaining touch control lines are used for detection and transmission of the touch signals.

Figure 6:
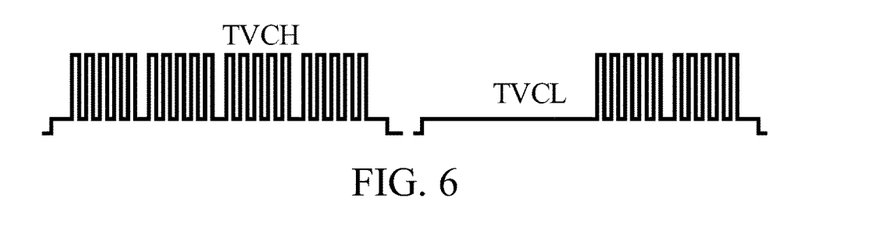
FIG. 6 is a waveform diagram of a touch control driving electrical signal and a photosensitive driving electrical signal of the display panel according to an embodiment of the present disclosure.
Figure 7:
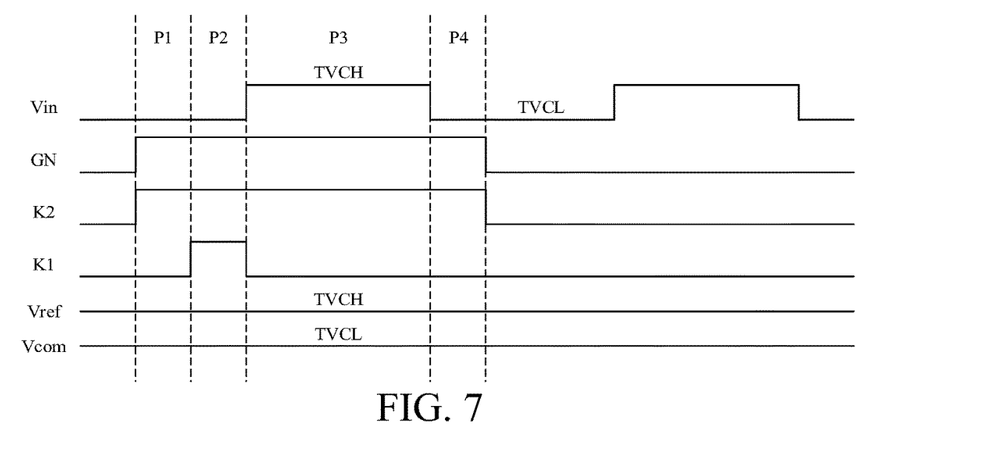
FIG. 7 is a timing diagram of a photosensitive driving circuit of the display panel according to an embodiment of the present disclosure.

Referring to FIGS. 4 and 6, FIG. 6 shows a waveform diagram of a touch control driving electrical signal and a photosensitive driving electrical signal of the display panel according to an embodiment of the present disclosure, that is, a waveform diagram corresponding to the photosensitive input electrical signal Vin1 and the touch control input electrical signal Vin2. In a non-touch state, the third capacitor C3 of a touch control sensor is C3', then Vout'=Q7C4=Vin2*C3'C4. In a touch state, the third capacitor C3 of the touch control sensor becomes C3", then Vout"=Q"/C4=Vin2*C3"/C4. Therefore, by comparing a change of a value of Vout, it can be determined whether there is a finger touch. Wherein, when the touch control driving electrical signal is a high electrical potential TVCH, the third capacitor C3 is charged, and when the touch control driving electrical signal is a low electrical potential TVCL, the charge is transferred, and a state of Vout is detected.

Figure 8:
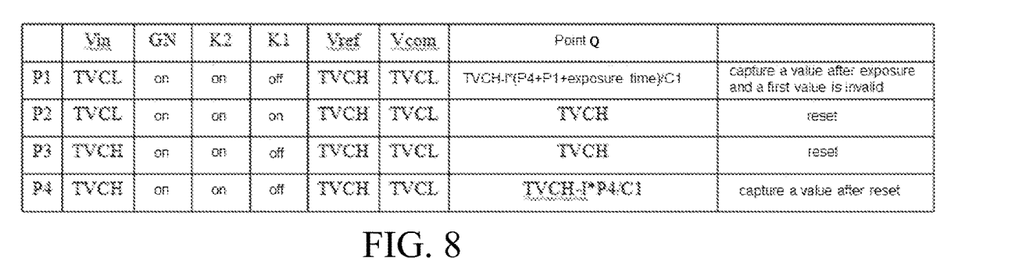
FIG. 8 is a timing table of the photosensitive driving circuit of the display panel according to an embodiment of the present disclosure.

Referring to FIGS. 5 to 8, FIG. 7 shows a timing diagram of the photosensitive driving circuit of the display panel according to an embodiment of the present disclosure, and FIG. 8 shows a timing table of the photosensitive driving circuit of the display panel according to an embodiment of the present disclosure. As shown in the figures, P1 period is an exposure signal capture stage, the gate signal GN is at the high electrical potential, the switch transistor T is turned on, the second switch K2 is turned on, and the first switch K1 is turned off. The change of the charge on the first capacitor C1 after exposure is captured, that is, the voltage change at the point Q, which is a value after exposure. P2 period is a signal reset stage, the gate signal GN is at the high electrical potential, the switch transistor T is turned on, the second switch K2 is turned on, the first switch K1 is turned on, and the voltage at the point Q is charged to a fixed electrical potential. P3 period is synchronously in the signal reset stage, the gate signal GN is at the high electrical potential, the switch transistor T is turned on, the second switch K2 is turned on, the first switch K1 is turned off, and the voltage at the point Q maintains the fixed electrical potential. P4 period is a stage of evaluation at the Q point after reset, the gate signal GN is at the high electrical potential, the switch transistor T is turned on, the second switch K2 is turned on, and the first switch K1 is turned off. After the capture state is reset, a reference value at the point Q is captured, and a difference is calculated with the value at the point Q after exposure in the P1 period to confirm that the change of the charge at the point Q caused by the exposure, thereby giving a feedback to a light intensity of external environment. Wherein, A value captured after expose at a first P1 period is an invalid value. In remaining times, a value of electrical potential at the point Q after expose at the P1 period is TVCH-I*(P4+P1+exposure time)/C1, and a value of electrical potential at the point Q after reset at the P4 period is TVCH-I*P4/C1.

The photosensitive driving circuit provided in this embodiment may use the same chip with the touch control driving circuit for driving. Further, the photosensitive driving circuit provided in this embodiment may use the same chip with the touch control driving circuit and the display driving circuit for driving. The photosensitive driving circuit provided in this embodiment may also use an independent driving chip for driving, that is, using a driving chip that is different from a touch control driving chip for driving, and is not limited herein. Preferably, the photosensitive driving circuit, the touch control driving circuit, and the display driving circuit use the same chip for driving.

Figure 9:
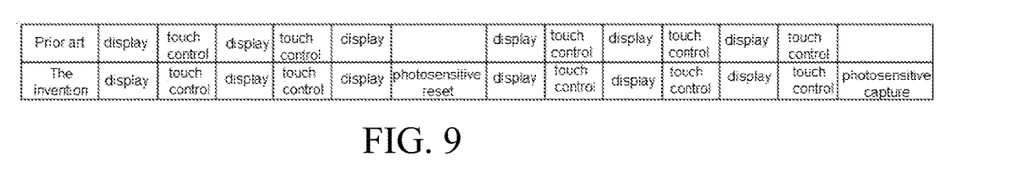
FIG. 9 is a comparison table of work timing between the display panel according to an embodiment of the present disclosure and that of prior art.

The photosensitive driving circuit provided in this embodiment and the touch control driving circuit may be driven at a same time. When the photosensitive driving circuit and the touch control driving circuit use the same chip for driving, the chip outputs driving signals to the photosensitive driving circuit and the touch control driving circuit at the same time, and the photosensitive driving circuit and the touch control driving circuit work at the same time. When the photosensitive driving circuit and the touch control driving circuit are driven by different chips, a photosensitive driving chip drives the photosensitive driving circuit while a touch control driving chip drives the touch control driving circuit. The photosensitive driving circuit provided in this embodiment and the touch control driving circuit may also be driven in a time-divisionally driven manner. As shown in FIG. 9, FIG. 9 shows a comparison table of work timing between the display panel according to an embodiment of the present disclosure and that of prior art. A reset period and a capture period of a photosensitive driving period are set in an original blanking period of one frame time, which allows an exposure time of the photosensitive components to be a frame period time. Therefore, under the premise of not changing original frame periods of display and touch control, integration of the photosensitive functions is realized. Therefore, an area of a photosensitive sensor may be evaluated and designed according to a fixed exposure time.

Figure 5:
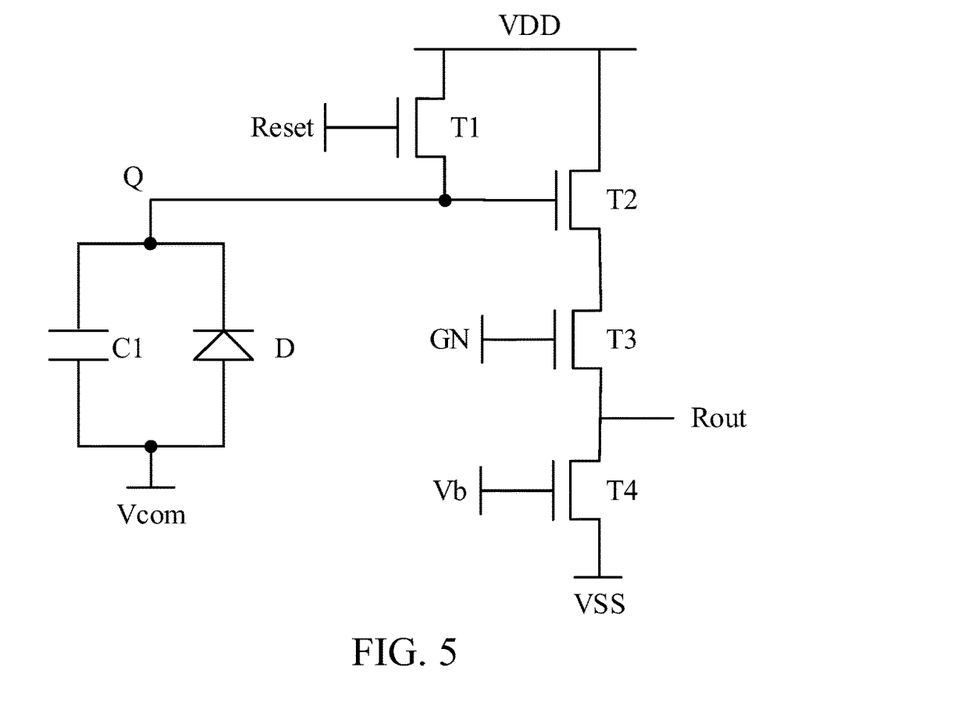
FIG. 5 is a schematic circuit diagram of a second photosensitive driving circuit of the display panel according to an embodiment of the present disclosure.

In an embodiment, referring to FIG. 5, FIG. 5 shows a schematic circuit diagram of a second photosensitive driving circuit of the display panel according to an embodiment of the present disclosure. As shown in FIG. 5, the photosensitive driving circuit includes:

a first capacitor C1, a photodiode D, a first transistor T1, a second transistor T2, a third transistor T3, and a fourth transistor T4. The first capacitor C1 is connected in parallel with the photodiode D, a positive electrode of the photodiode D is connected to a common electrical signal Vcom, a negative electrode of the photodiode D is connected to a second electrode of the first transistor T1 and a gate electrode of the second transistor T2, a first electrode of the first transistor T1 and a first electrode of the second transistor T2 are connected to a power supply signal VDD, a second electrode of the second transistor T2 is connected to a first electrode of the third transistor T3, a second electrode of the third transistor T3 is connected to a first electrode of the fourth transistor T4 and an output terminal Rout, a gate electrode of the third transistor T3 is connected to a gate signal GN, a gate electrode of the fourth transistor T4 is connected to a base signal Vb, and a second electrode of the fourth transistor T4 is connected to a ground signal VSS.

Wherein, the first transistor T1 is a reset transistor, which is used to reset the point Q. When the first transistor T1 is turned on, the power supply signal VDD of a fixed potential is input to the point Q by the first transistor T1. At this time, a voltage of the gate electrode of the second transistor T2 is steadily the power supply signal VDD of the fixed potential. When the photosensitive components are exposed and a value is captured, the first transistor T1 is turned off, the third transistor T3 and the fourth transistor T4 are turned on, the first electrode of the second transistor T2 is connected to the power supply signal VDD, and the voltage of the gate electrode of the second transistor T2 is the voltage at point Q. The voltage at point Q is affected by the photodiode D, and different ambient light intensities cause light-induced leakage currents generated by the photodiode D to be different, so the voltage potential of point Q will change, a conduction state of the second transistor T2 will change, and a resistance value of the second transistor T2 will change, thereby making a partial voltage on the fourth transistor T4 to be different, and the voltage of the output terminal Rout to be different.

By collecting and analyzing a voltage change of the output terminal Rout, an external ambient light signal can be fed back.

Similarly, the photosensitive driving circuit provided in this embodiment may use the same chip with the touch control driving circuit for driving. Further, the photosensitive driving circuit provided in this embodiment may use the same chip with the touch control driving circuit and the display driving circuit for driving. The photosensitive driving circuit provided in this embodiment may also use an independent driving chip for driving, that is, using a driving chip that is different from a touch control driving chip for driving, and is not limited herein. Preferably, the photosensitive driving circuit, the touch control driving circuit, and the display driving circuit use the same chip for driving.

The photosensitive driving circuit provided in this embodiment and the touch control driving circuit may be driven at the same time. Similarly, the photosensitive driving circuit may also use the independent driving chip for driving. The photosensitive driving circuit provided in this embodiment and the touch control driving circuit may also be driven in the time-divisionally driven manner. As shown in FIG. 9, the reset period and the capture period of the photosensitive driving period are set in the original blanking period of one frame time, which allows the exposure time of the photosensitive components to be the frame period time. Similarly, the area of the photosensitive sensor may be evaluated and designed according to the fixed exposure time.

In summary, the embodiments of the present disclosure provide the display panel, which has the display area and the non-display area surrounding the display area, and includes the photosensitive components and the photosensitive driving circuit. The photosensitive components are used to sense the ambient light, and the photosensitive driving circuit is connected to the photosensitive components to drive the photosensitive components. Wherein, the photosensitive driving circuit is disposed in the non-display area, and at least a part of the photosensitive components is disposed in the non-display area. By disposing the photosensitive components and the photosensitive driving circuit that are used to sense ambient light inside the display panel, thereby realizing the integration of ambient light detection into the display panel. Therefore, integrating ambient light detection functions without increasing bezels of display devices, the present disclosure can omit external independent ambient light detection modules, reduce the bezels of the display devices, and reduce costs of ambient light detection modules at the same time.

The display panel provided in the embodiments of the present disclosure is described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A display panel, having a display area and a non-display area surrounding the display area and comprising photosensitive components, a photosensitive driving circuit, a touch control component, and a touch control driving circuit, wherein the photosensitive components are used to sense ambient light, and the photosensitive driving circuit is connected to the photosensitive components to drive the photosensitive components, the touch control component is connected to the touch control driving circuit, and the touch control driving circuit is used to drive the touch control component; and wherein the photosensitive driving circuit is disposed in the non-display area, and at least a part of the photosensitive components is disposed in the non-display area, wherein the photosensitive driving circuit comprises:

a first capacitor, a photodiode, and a switch transistor, wherein the first capacitor and the photodiode are connected in parallel, a positive electrode of the photodiode is connected to a common electrical signal, a negative electrode of the photodiode is connected to a first electrode of the switch transistor, a gate electrode of the switch transistor is connected to a gate signal, and a second electrode of the switch transistor is connected to a photosensitive input electrical signal; and a first switch, a second switch, a second capacitor, and an amplifier, wherein the first switch, the second capacitor, and the amplifier are connected in parallel with each other, one end of the second switch is connected to the photosensitive input electrical signal, another end of the second switch is connected to a non-inverting input terminal of the amplifier, an inverting input terminal of the amplifier is connected to a reference electrical signal, and an output terminal of the amplifier is connected to a digital-to-analog converter, and wherein the touch control driving circuit comprises a third capacitor, a fourth capacitor, and a second amplifier, the fourth capacitor and the second amplifier are connected in parallel, one end of the third capacitor is connected to the common electrical signal, another end of the third capacitor is connected to a non-inverting input terminal of the second amplifier and a touch control input electrical signal, an inverting input terminal of the second amplifier is connected to the reference electrical signal, and an output terminal of the second amplifier is connected to an output terminal of the touch control driving circuit.

2. The display panel according to claim 1, wherein all the photosensitive components are disposed in the non-display area.

3. The display panel according to claim 1, wherein a part of the photosensitive components is disposed in the display area.

4. The display panel according to claim 1, wherein the at least the part of the photosensitive components disposed in the non-display area is set on at least one side of a first side or a second side of the display area, and the first side and the second side are opposite to each other.

5. The display panel according to claim 4, wherein the at least the part of the photosensitive components disposed in the non-display area is further set on a third side of the display area, and the third side is connected to the first side and the second side.

6. The display panel according to claim 1, wherein the photosensitive components comprise at least one optical sensor assembly, and the at least one optical sensor assembly comprises at least one optical sensor.

7. The display panel according to claim 6, wherein the at least one optical sensor assembly comprises a visible light sensor, or a white light sensor and a reference light sensor, or a white light sensor, a reference light sensor, a red light sensor, a green light sensor, and a blue light sensor.

8. The display panel according to claim 6, wherein the at least one optical sensor is one of a photosensitive P-N junction, a photosensitive diode, or a photosensitive thin film transistor.

9. The display panel according to claim 1, wherein the photosensitive driving circuit and the touch control driving circuit use a same chip for driving.

10. The display panel according to claim 9, further comprising a display component and a display driving circuit, wherein the display component is connected to the display driving circuit, the display driving circuit is used to drive the display component, and the photosensitive driving circuit and the display driving circuit use the same chip for driving.

11. The display panel according to claim 1, wherein the photosensitive driving circuit and the touch control driving circuit use different chips for driving.

12. The display panel according to claim 1, wherein the photosensitive components and the touch control component are driven at a same time.

13. The display panel according to claim 1, wherein the photosensitive components and the touch control component are driven in a time-divisionally driven manner.

14. The display panel according to claim 13, further comprising a display component and a display driving circuit, wherein the display component is connected to the display driving circuit, the display driving circuit is used to drive the display component, and the photosensitive components, the touch control component, and the display component are driven in the time-divisionally driven manner.

15. The display panel according to claim 14, wherein a driving period of the photosensitive components is a blanking period other than a driving period of the touch control component and a driving period of the display component within one frame time.

16. The display panel according to claim 1, wherein at least a part of the photosensitive driving circuit and the touch control driving circuit use a same line path.

17. The display panel according to claim 1, wherein the photosensitive driving circuit and the touch control driving circuit use different line paths.

* * * * *